US012619301B2

(12) United States Patent
Yuan et al.

(10) Patent No.: US 12,619,301 B2
(45) Date of Patent: May 5, 2026

(54) METHOD AND APPARATUS FOR ADJUSTING DISPLAY DEVICE

(71) Applicant: Shenzhen Yinwang Intelligent Technologies Co., Ltd., Shenzhen (CN)

(72) Inventors: Lu Yuan, Shenzhen (CN); Jingfang Zha, Shanghai (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/941,588

(22) Filed: Nov. 8, 2024

(65) Prior Publication Data

US 2025/0123683 A1      Apr. 17, 2025

Related U.S. Application Data

(63) Continuation of application No. PCT/CN2022/137563, filed on Dec. 8, 2022.

(30) Foreign Application Priority Data

May 10, 2022    (CN) .......................... 202210505723.1

(51) Int. Cl.
| | |
|---|---|
| *G06F 3/01* | (2006.01) |
| *G06T 3/60* | (2006.01) |
| *G06V 40/16* | (2022.01) |

(52) U.S. Cl.
CPC ............... *G06F 3/012* (2013.01); *G06T 3/60* (2013.01); *G06V 40/165* (2022.01)

(58) Field of Classification Search
CPC .......... G06F 3/012; G06F 3/013; G06F 3/147; G06F 3/011; G06F 3/1415; G06T 3/60; G06V 40/165; H04N 13/302; H04N 13/30; G09G 2320/068; G09G 2354/00; G09G 2380/10
See application file for complete search history.

(56) References Cited

U.S. PATENT DOCUMENTS

| | | | | |
|---|---|---|---|---|
| 2020/0192093 A1* | 6/2020 | Lee | .................... | G02B 27/0103 |
| 2022/0230456 A1* | 7/2022 | Kasarla | .................. | G06F 3/013 |
| 2022/0281317 A1* | 9/2022 | Ahn | .......................... | G06T 5/80 |

FOREIGN PATENT DOCUMENTS

| | | | |
|---|---|---|---|
| CN | 111163303 | A | 5/2020 |
| CN | 113467600 | A | 10/2021 |
| CN | 113467601 | A | 10/2021 |
| CN | 115061565 | A | 9/2022 |
| EP | 3608755 | A1 | 2/2020 |
| JP | 2019174853 | A | 10/2019 |
| JP | 2020134426 | A | 8/2020 |
| KR | 20090129018 | A | 12/2009 |
| KR | 20120064557 | A | 6/2012 |
| WO | 2021075118 | A1 | 4/2021 |

* cited by examiner

*Primary Examiner* — Premal R Patel
(74) *Attorney, Agent, or Firm* — Conley Rose, P.C.

(57)      ABSTRACT
A method and an apparatus is for adjusting a display device and includes: obtaining a first facial image of a first user; determining first spatial coordinates of a facial feature point of the first user based on the first facial image; and adjusting, based on the first spatial coordinates, an orientation of a first side of an image displayed by the display device, where the first side of the image includes information to be communicated to the first user.

20 Claims, 8 Drawing Sheets

400

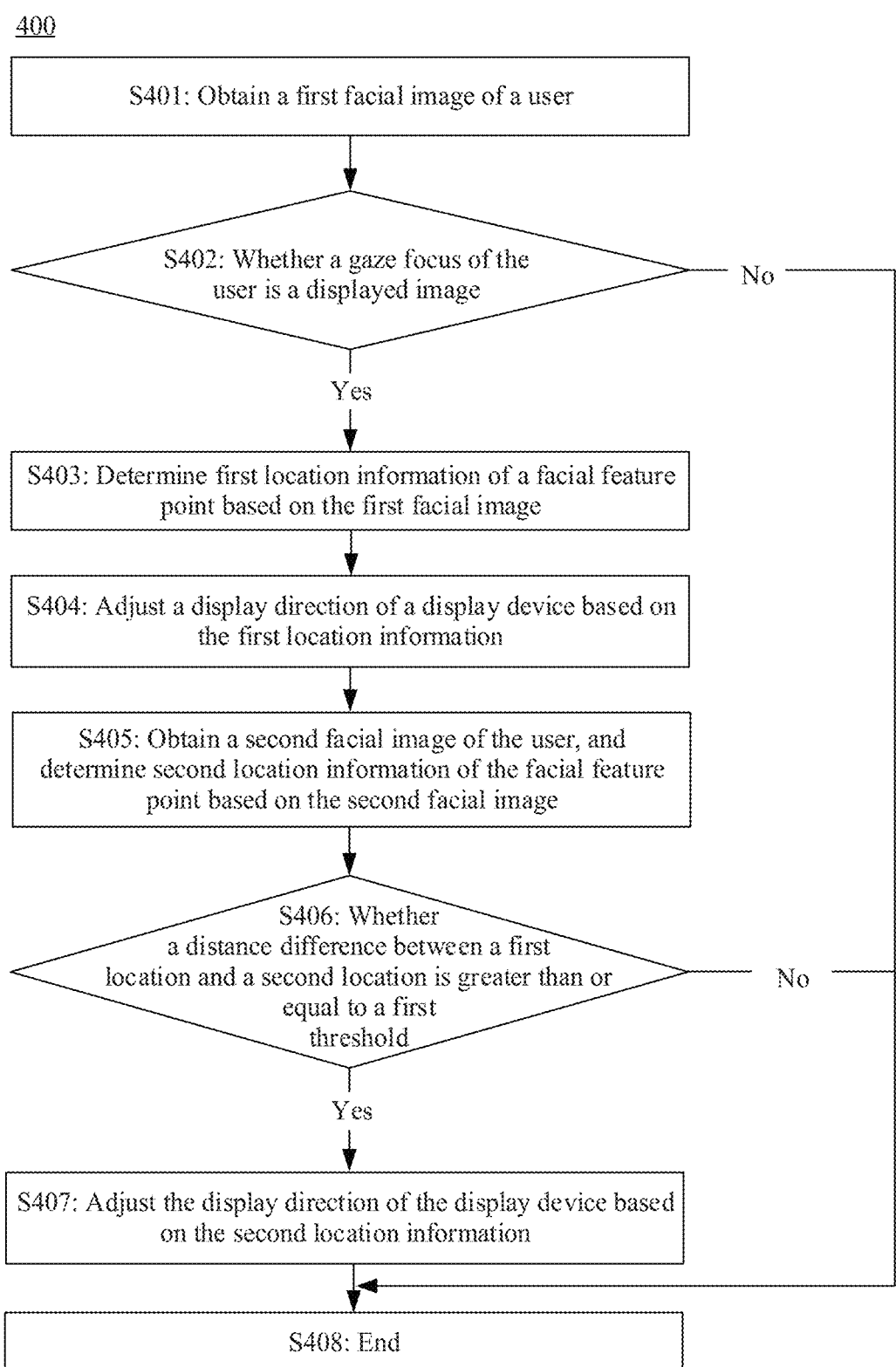

S401: Obtain a first facial image of a user

S402: Whether a gaze focus of the user is a displayed image — No

Yes

S403: Determine first location information of a facial feature point based on the first facial image S404: Adjust a display direction of a display device based on the first location information S405: Obtain a second facial image of the user, and determine second location information of the facial feature point based on the second facial image S406: Whether a distance difference between a first location and a second location is greater than or equal to a first threshold — No Yes S407: Adjust the display direction of the display device based on the second location information S408: End

| S701: Obtain audio data inside a vehicle, and determine a sound source location of the audio data |

| S702: Determine a location of a user based on the sound source location |

Holographic image

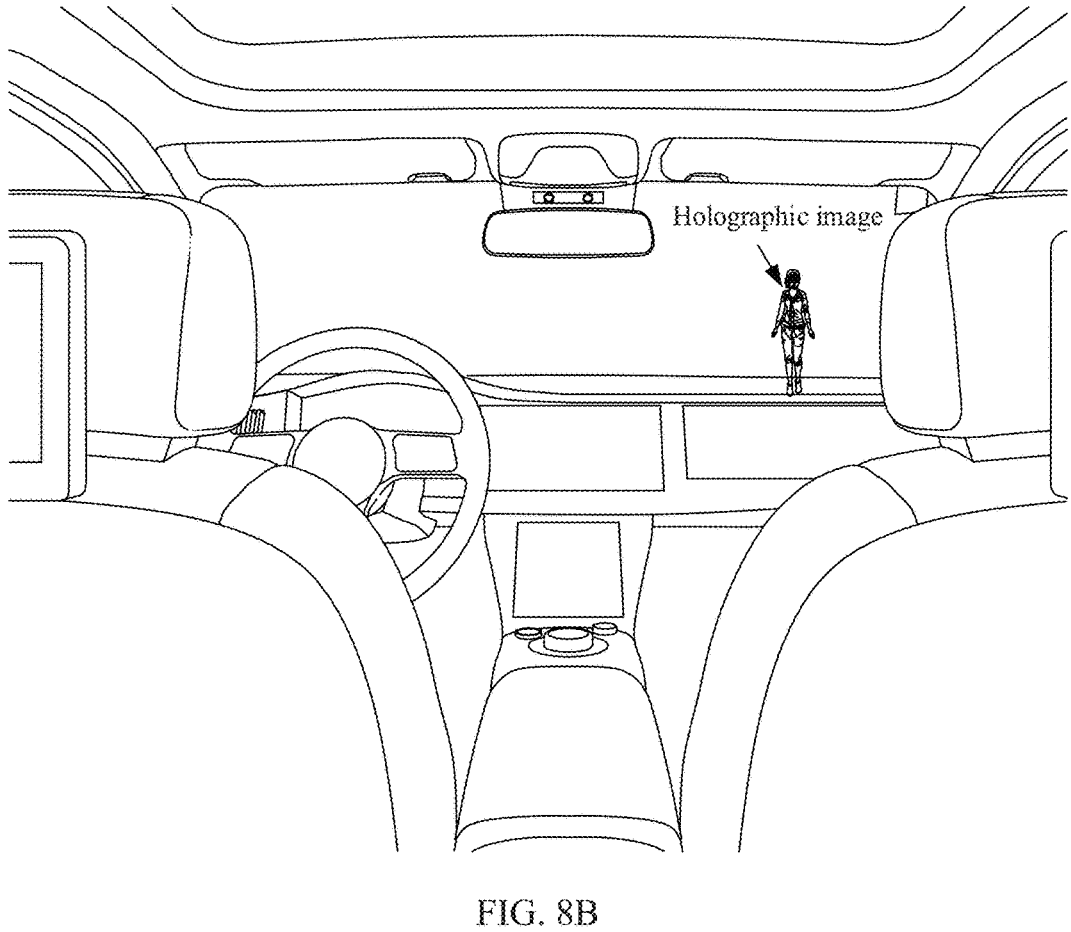

| S901: Obtain a first facial image of a first user |
|---|

| S902: Determine first spatial coordinates of a facial feature point of the first user based on the first facial image |
|---|

| S903: Adjust, based on the first spatial coordinates, an orientation of a first side of an image displayed by a display device, where the first side of the image includes information to be communicated to the first user |
|---|

FIG. 9

METHOD AND APPARATUS FOR ADJUSTING DISPLAY DEVICE

CROSS-REFERENCE TO RELATED APPLICATIONS

This is a continuation of International Patent Application No. PCT/CN2022/137563 filed on Dec. 8, 2022, which claims priority to Chinese Patent Application No. 202210505723.1 filed on May 10, 2022. The disclosures of the aforementioned applications are hereby incorporated by reference in their entireties.

TECHNICAL FIELD

The present disclosure relates to the field of human-computer interaction, and more specifically, to a method and an apparatus for adjusting a display device.

BACKGROUND

With development of smart vehicles, more imaging display devices are integrated into a cockpit, for example, display devices such as a vehicle-mounted large screen, a head-up display (HUD) device, and a vehicle-mounted holographic image. However, display ranges of existing display devices are limited. When a user is in different locations, for the user, these display devices are not necessarily at a good display angle or location, and even a case in which imaging is incomplete and display is invisible may occur.

Therefore, a method and an apparatus that can accurately adjust a display device based on a location of a user need to be developed urgently.

SUMMARY

The present disclosure provides a method and an apparatus for adjusting a display device, to accurately adjust, based on a location of a user, an orientation of an image displayed by the display device, and help improve user experience at a human-computer interaction level.

According to a first aspect, a method for adjusting a display device is provided, and the method may be performed by a vehicle; or may be performed by a vehicle-mounted terminal of a vehicle, such as a vehicle-mounted head unit; or may be performed by a chip or a circuit used in a vehicle. This is not limited in the present disclosure. For ease of description, an example in which a vehicle performs the method is used below for description.

The method may include: obtaining a first facial image of a first user; determining first spatial coordinates of a facial feature point of the first user based on the first facial image; and adjusting, based on the first spatial coordinates, an orientation of a first side of an image displayed by the display device, where the first side of the image includes information to be communicated to the first user.

In the foregoing technical solution, the orientation of the image displayed by the display device is accurately adjusted based on a location of a user, so that use experience of the user can be improved at an interaction level.

In some possible implementations, the first spatial coordinates are three-dimensional (3D) coordinates of the facial feature point of the user in a vehicle coordinate system.

For example, the facial feature point may be located in any one or more of a center of eyebrows, an eye, an eyebrow, or a nose of the first user. Alternatively, the facial feature point may be a point at another location on a face of the first user. This is not specifically limited in embodiments of the present disclosure.

In some possible implementations, the image may be a 3D image, for example, holographic projection. It should be understood that different angles of holographic projection include different information. Alternatively, the image may be a two-dimensional (2D) image that interacts with the first user and has a 3D feature, for example, a digital human. It should be understood that different interaction effects can be implemented when a face of the digital human faces different directions. For example, when the face of the digital human faces the first user, the first user can feel an effect of face-to-face communication with the digital human.

For example, the image is a 3D image of a virtual assistant, and the first side of the image may be a side that includes a front side of a face of the virtual assistant. In another example, the image is a 3D image of the vehicle. To display a style of a front enclosure of the vehicle to the first user, the first side of the image may be a side that includes the front enclosure of the vehicle.

For example, adjusting the orientation of the first side of the image may include adjusting a posture of the image. For example, when the image is a 3D image of a virtual assistant, a head posture of the image may be adjusted, so that a face of the image faces the first user.

With reference to the first aspect, in some implementations of the first aspect, the method further includes: after the orientation of the first side of the image displayed by the display device is adjusted based on the first spatial coordinates, obtaining a second facial image of a second user; determining second spatial coordinates of a facial feature point of the second user based on the second facial image; and adjusting, based on the second spatial coordinates, the orientation of the first side of the image displayed by the display device.

In some possible implementations, determining of the second spatial coordinates may be actively triggered by the second user. For example, the second user triggers based on a voice instruction, for example, the second user sends a voice instruction "holographic image, please face me". Alternatively, the second user triggers by using a related button, for example, the second user taps a button for "opening holographic image". Further, the vehicle controls a camera apparatus to obtain the second facial image of the second user, and further determines the second spatial coordinates of the facial feature point of the second user.

In some possible implementations, after preset duration after the orientation of the first side of the image displayed by the display device is adjusted based on the first spatial coordinates, the second facial image of the second user is obtained. For example, the preset duration may be 3 seconds, or 5 seconds, or may be other preset duration. This is not specifically limited in embodiments of the present disclosure.

In the foregoing technical solution, when there are two or more users, the orientation of the image displayed by the display device may be adjusted based on 3D coordinates of a facial feature point of each user in the plurality of users, to improve interaction experience in a multi-user scenario.

With reference to the first aspect, in some implementations of the first aspect, the method further includes: after the orientation of the first side of the image displayed by the display device is adjusted based on the first spatial coordinates, obtaining a third facial image of the first user; determining third spatial coordinates of the facial feature point of the first user based on the third facial image; and when a distance between the first spatial coordinates and the third spatial coordinates is greater than or equal to a preset threshold, adjusting, based on the third spatial coordinates, the orientation of the first side of the image displayed by the display device.

In some possible implementations, when the first user interacts with the image, and a head location of the first user changes, the second facial image of the first user may be obtained, and a second coordinate location of the facial feature point is determined based on the second facial image.

Further, when a moving distance of a head of the first user exceeds the preset threshold, the orientation of the first side of the image is adjusted based on the second spatial coordinates.

For example, the preset threshold may be 15 centimeters (cm), 20 cm, or may be another distance. This is not specifically limited in embodiments of the present disclosure.

In the foregoing technical solution, when the moving distance of the head position of the user exceeds the preset distance, the orientation of the image is adjusted based on a move-to location of the user, so that frequent adjustment of the orientation of the image can be avoided, and driving experience of the user can be improved.

With reference to the first aspect, in some implementations of the first aspect, the method further includes: before the first facial image of the first user is obtained, obtaining audio information, where the audio information includes a voice instruction of the first user, and the voice instruction indicates to start and/or adjust the display device; determining a sound source location of the audio information; and determining a location of the first user based on the sound source location.

In the foregoing technical solution, in the multi-user scenario, when a user sends a voice instruction, it may be determined, based on a sound source location, whether the user sending the instruction is a driver, a front passenger, or a rear passenger, and then the display device is correspondingly adjusted, so that a side that is of the image displayed by the display device and that includes information to be communicated to the user faces the user, to improve interaction between the user and the image displayed by the display device.

With reference to the first aspect, in some implementations of the first aspect, the audio information further includes a voice instruction of the second user, and the method further includes: controlling the display device to display a first image and a second image; and adjusting the display device, so that a first side of the first image faces the first user and a first side of the second image faces the second user, where the image displayed by the display device includes the first image and/or the second image, the first side of the first image includes information to be communicated to the first user, and the first side of the second image includes information to be communicated to the second user.

In the foregoing technical solution, in the multi-user scenario, the display device may further copy the image, so that each image faces one of the plurality of users, to further improve interaction experience and driving interest of the user.

With reference to the first aspect, in some implementations of the first aspect, the method further includes: adjusting, based on the first spatial coordinates, a location of the image displayed by the display device.

In some possible implementations, a location of the image in a y axis direction in the vehicle coordinate system may be adjusted based on the first spatial coordinates. For example, after the location of the user is determined, the display device may be adjusted, so that the image projected by the display device moves to a location corresponding to the location of the user. For example, if the location of the user is a front passenger seat, the display device may be adjusted, so that the location of the image is moved to the front passenger seat.

In some possible implementations, a location of the image in a z axis direction in the vehicle coordinate system may be adjusted based on the first spatial coordinates. For example, after the location of the user is determined, the display device may be adjusted, so that a height of the image projected by the display device moves to a height suitable for viewing by the user.

It should be understood that the y axis direction in the vehicle coordinate system is a direction perpendicular to a longitudinal symmetry plane of the vehicle, and the z axis direction in the vehicle coordinate system is parallel to the longitudinal symmetry plane of the vehicle.

In the foregoing technical solution, the display device is adjusted to control the image to move to the location of the user, or control the image to move to a suitable height, so that the user does not need to turn around to interact with the image displayed by the display device. This helps improve driving experience of the user.

With reference to the first aspect, in some implementations of the first aspect, the method further includes: before the orientation of the first side of the image displayed by the display device is adjusted based on the first spatial coordinates, obtaining initial posture information of the display device, where the initial posture information indicates a posture angle and a location of the display device. The adjusting, based on the first spatial coordinates, an orientation of a first side of an image displayed by the display device includes: determining a rotation angle and a rotation direction of the display device based on the first spatial coordinates and the initial posture information; and adjusting, based on the rotation angle and the rotation direction, the orientation of the first side of the image displayed by the display device.

In some possible implementations, before the orientation of the first side of the image displayed by the display device is adjusted based on the first spatial coordinates, the initial posture information of the image is obtained, where the initial posture information of the image indicates the posture angle and the location of the image; and the rotation angle and the rotation direction of the image are determined based on the first spatial coordinates and the initial posture information of the image. Further, the rotation angle and the rotation direction of the display device are determined based on mapping relationship between an angle change of the display device and an angle change of the image, and then the display device is adjusted. For example, if the image is a virtual assistant, the posture angle of the image may be a head posture angle of the virtual assistant.

With reference to the first aspect, in some implementations of the first aspect, the first spatial coordinates of the facial feature point of the first user indicate a 3D location of the facial feature point of the first user in a vehicle, and the vehicle includes the display device.

In the foregoing technical solution, the display device can be adjusted based on the 3D coordinates of the facial feature point of the user in the vehicle coordinate system, so that the orientation of the image displayed by the display device can be accurately adjusted, to provide better interaction effect for the user, and improve interaction experience of the user.

With reference to the first aspect, in some implementations of the first aspect, the display device includes a holographic projection device, and the image includes a 3D image.

According to a second aspect, an apparatus for adjusting a display device is provided. The apparatus includes: an obtaining unit configured to obtain a first facial image of a first user; and a processing unit configured to determine first spatial coordinates of a facial feature point of the first user based on the first facial image; and adjust, based on the first spatial coordinates, an orientation of a first side of an image displayed by the display device.

With reference to the second aspect, in some implementations of the second aspect, the obtaining unit is further configured to: after the orientation of the first side of the image displayed by the display device is adjusted based on the first spatial coordinates, obtain a second facial image of a second user. The processing unit is further configured to: determine second spatial coordinates of a facial feature point of the second user based on the second facial image; and adjust, based on the second spatial coordinates, the orientation of the first side of the image displayed by the display device.

With reference to the second aspect, in some implementations of the second aspect, the obtaining unit is further configured to: after the orientation of the first side of the image displayed by the display device is adjusted based on the first spatial coordinates, obtain a third facial image of the first user. The processing unit is further configured to: determine third spatial coordinates of the facial feature point of the first user based on the third facial image; and when a distance between the first spatial coordinates and the third spatial coordinates is greater than or equal to a preset threshold, adjust, based on the third spatial coordinates, the orientation of the first side of the image displayed by the display device.

With reference to the second aspect, in some implementations of the second aspect, the obtaining unit is further configured to: before obtaining the first facial image of the first user, obtain audio information, where the audio information includes a voice instruction of the first user, and the voice instruction indicates to start and/or adjust the display device. The processing unit is further configured to: determine a sound source location of the audio information; and determine a location of the first user based on the sound source location.

With reference to the second aspect, in some implementations of the second aspect, the audio information further includes a voice instruction of the second user, and the processing unit is further configured to: control the display device to display a first image and a second image; and adjust the display device, so that a first side of the first image faces the first user and a first side of the second image faces the second user, where the image displayed by the display device includes the first image and/or the second image, the first side of the first image includes information to be communicated to the first user, and the first side of the second image includes information to be communicated to the second user.

With reference to the second aspect, in some implementations of the second aspect, the processing unit is further configured to adjust, based on the first spatial coordinates, a location of the image displayed by the display device.

With reference to the second aspect, in some implementations of the second aspect, the obtaining unit is further configured to: before the orientation of the first side of the image displayed by the display device is adjusted based on the first spatial coordinates, obtain initial posture information of the display device, where the initial posture information indicates a posture angle and a location of the display device. The processing unit is further configured to: determine a rotation angle and a rotation direction of the display device based on the first spatial coordinates and the initial posture information; and adjust, based on the rotation angle and the rotation direction, the orientation of the first side of the image displayed by the display device.

With reference to the second aspect, in some implementations of the second aspect, the first spatial coordinates of the facial feature point of the first user indicate a 3D location of the facial feature point of the first user in a vehicle, and the vehicle includes the display device.

With reference to the second aspect, in some implementations of the second aspect, the display device includes a holographic projection device and the image includes a 3D image.

According to a third aspect, an apparatus for adjusting a display device is provided, and the apparatus includes: a memory configured to store a program; a processor configured to execute the program stored in the memory. When the program stored in the memory is executed, the processor is configured to perform the method according to any one of the possible implementations of the first aspect.

According to a fourth aspect, a vehicle is provided. The vehicle includes the apparatus according to any one of the possible implementations of the second aspect or the apparatus according to any one of the possible implementations of the third aspect, and the display device. The display device may be a holographic projection device, and a displayed image may be a 3D image. Alternatively, the display device may be a vehicle-mounted display, and a displayed image may be a digital human. Alternatively, the display device may be another display device. This is not specifically limited in the present disclosure.

According to a fifth aspect, a computer program product is provided. The computer program product includes computer program code. When the computer program code is run on a computer, the computer is enabled to perform the method according to any one of the possible implementations of the first aspect.

It should be noted that all or some of computer program code may be stored in a first storage medium. The first storage medium may be encapsulated together with a processor, or may be encapsulated separately from a processor. This is not specifically limited in embodiments of the present disclosure.

According to a sixth aspect, a computer-readable medium is provided, where the computer-readable medium stores program code, and when the computer program code is run on a computer, the computer is enabled to perform the method according to any one of the possible implementations of the first aspect.

According to a seventh aspect, a chip is provided. The chip includes a processor configured to invoke a computer program or computer instructions stored in a memory, so that the processor is enabled to perform the method according to any one of the possible implementations of the first aspect.

With reference to the seventh aspect, in a possible implementation, the processor is coupled to the memory through an interface.

With reference to the seventh aspect, in a possible implementation, the chip system further includes a memory, and the memory stores a computer program or computer instructions.

According to the method for adjusting a display device provided in embodiments of the present disclosure, an orientation of an image displayed by the display device can be accurately adjusted based on a location of a user, to improve user experience at an interaction level. The display device can be adjusted based on a location to which the head of the user moves. When a moving distance of the head of the user exceeds a preset distance, the orientation of the image is adjusted based on a location to which the head of the user moves. This can avoid frequent adjustment of the orientation of the image, and help improve driving experience of the user. When there are two or more users, the orientation of the image displayed by the display device may be adjusted based on 3D coordinates of a facial feature point of each of the plurality of users, to improve interaction experience in a multi-user scenario. The location of the user can alternatively be determined based on a voice instruction sent by the user, and then the display device is adjusted based on the location of the user. In the multi-user scenario, when a user sends a voice instruction, it may be determined, based on a sound source location, whether the user sending the instruction is a driver, a front passenger, or a rear passenger, and then the display device is correspondingly adjusted, so that a side that is of the image displayed by the display device and that includes information to be communicated to the user faces the user, to improve interaction between the user and the image displayed by the display device. In the multi-user scenario, the display device may further copy the image, so that each image faces one of the plurality of users, to further improve interaction experience and driving interest of the users. Further, the display device can be adjusted to control the image to move to the location of the user, or control the image to move to a suitable height, so that the user does not need to turn around to interact with the image displayed by the display device. This helps improve driving experience of the user.

BRIEF DESCRIPTION OF DRAWINGS

FIG. 4 is a schematic flowchart of a method for adjusting a display device according to an embodiment of the present disclosure;

FIG. 7 is another schematic flowchart of a method for adjusting a display device according to an embodiment of the present disclosure;

FIG. 8A and FIG. 8B are a schematic of another application scenario of adjusting an image displayed by a display device according to an embodiment of the present disclosure;

FIG. 9 is still another schematic flowchart of a method for adjusting a display device according to an embodiment of the present disclosure;

8

Figure 10:
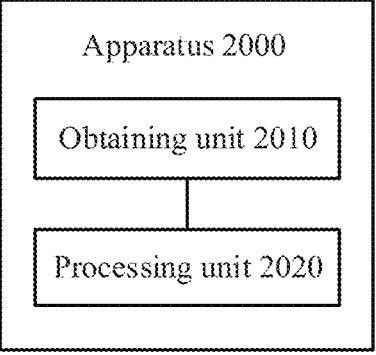
Figure 11:
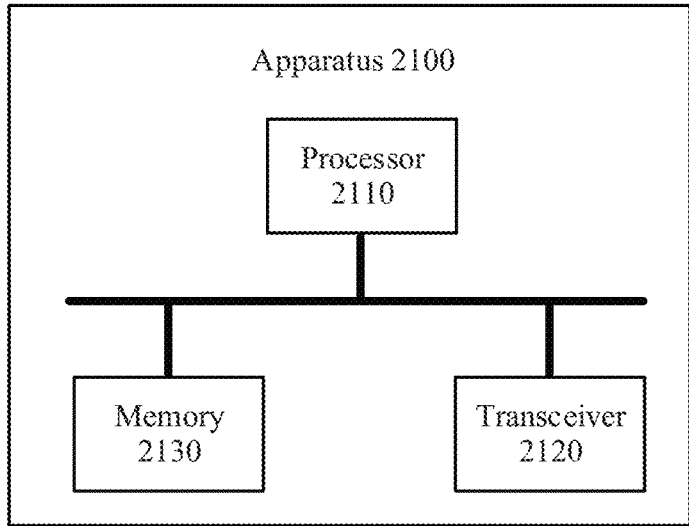

FIG. 10 is a block schematic of an apparatus for adjusting a display device according to an embodiment of the present disclosure; and FIG. 11 is a block schematic of an apparatus for adjusting a display device according to an embodiment of the present disclosure.

DESCRIPTION OF EMBODIMENTS

The following describes technical solutions of embodiments in the present disclosure with reference to accompanying drawings.

Figures 1A, 1B:
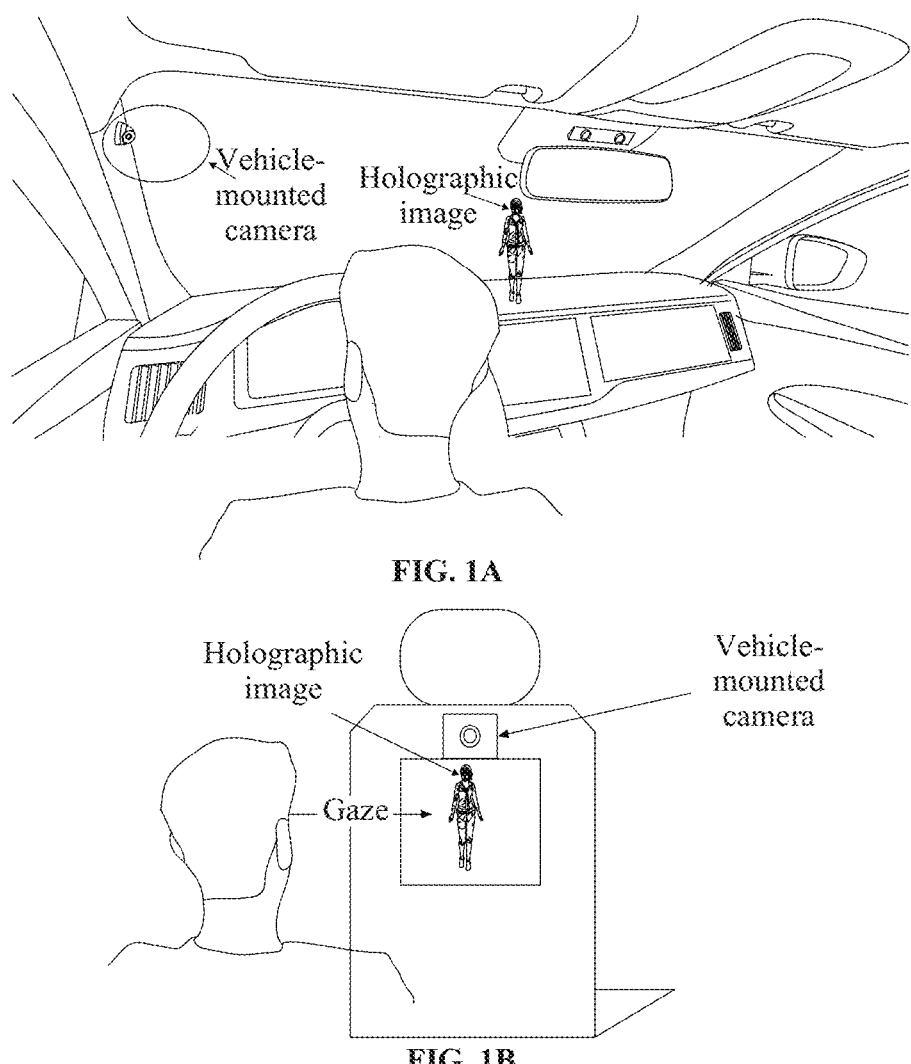
FIG. 1A and FIG. 1B illustrate an application scenario of a method for adjusting a display device according to an embodiment of the present disclosure.

FIG. 1A and FIG. 1B illustrate a vehicle cockpit scenario according to an embodiment of the present disclosure. One or more cameras may be installed inside a smart cockpit, for example, a camera of a driver monitor system (DMS), a camera of a cockpit monitor system (CMS), and a camera of a dashcam, to capture images inside or outside the cockpit. In FIG. 1A, a camera disposed on an A-pillar is used as an example. The cameras used to capture the inside and outside of the cockpit may be a same camera, or may be different cameras. In addition, a vehicle-mounted display is further disposed in the cockpit. In FIG. 1A, a display disposed in a central control area is used as an example. A vehicle may display information to a user by using at least one of the vehicle-mounted display, an HUD (not shown in FIG. 1A), and a vehicle-mounted holographic projection device (not shown in FIG. 1A). For example, a 3D image of a virtual assistant may be displayed to the user by using the vehicle-mounted holographic projection device. Details are shown in FIG. 1A. In some possible implementations, the vehicle-mounted holographic projection device may further perform imaging on a rear of a headrest of a front seat. Details are shown in FIG. 1B. It should be understood that the 3D image shown in FIG. 1A is merely an example for description, and specific content of the 3D image may alternatively be another 3D object, for example, may alternatively be a 3D image of the vehicle. It should be understood that, in embodiments of the present disclosure, a location of a camera that collects image information in the cockpit is not specifically limited. The camera may be located on the A-pillar shown in FIG. 1A, or may be located on a B-pillar, or may be located under a steering wheel, or may be located near a rearview mirror, or the like.

Figure 2:
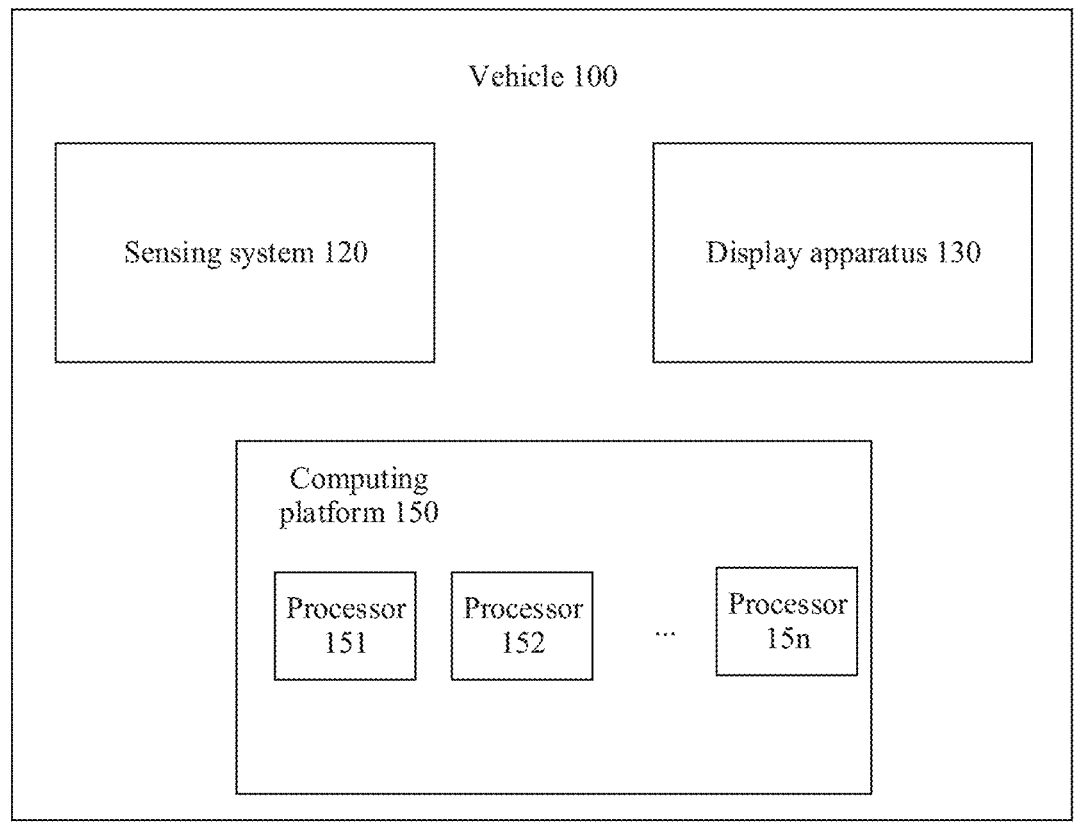
FIG. 2 is a block schematic of a vehicle according to an embodiment of the present disclosure.

FIG. 2 is a functional block schematic of a vehicle 100 according to an embodiment of the present disclosure. The vehicle 100 may include a sensing system 120, a display apparatus 130, and a computing platform 150. The sensing system 120 may include several types of sensors that sense information about an environment around the vehicle 100 and an environment of a vehicle cockpit. For example, the sensing system 120 may include a positioning system. The positioning system may be a Global Positioning System (GPS), or may be one or more of a BeiDou system or another positioning system, an inertial measurement unit (IMIU), a lidar, a millimeter-wave radar, an ultrasonic radar, a visual sensor, a sound sensor, and a camera apparatus. The camera apparatus may include a red, green and blue/infrared (RGB/IR) camera, or may include a depth camera, for example, a time of flight (TOF) camera, a binocular camera, or a structured light camera.

Some or all of functions of the vehicle 100 may be controlled by the computing platform 150. The computing platform 150 may include a processor 151 to a processor 15*n* (where n is a positive integer). The processor is a circuit that has a signal processing capability. In an implementation, the processor may be a circuit that has an instruction reading and running capability, for example, a central processing unit (CPU), a microprocessor, a graphics processing unit (GPU) (which may be understood as a microprocessor), a digital signal processor (DSP), or the like. In another implementation, the processor may implement a specific function based on a logical relationship of a hardware circuit. The logical relationship of the hardware circuit is fixed or reconfigurable. For example, the processor is an application-specific integrated circuit (ASIC) or a hardware circuit implemented by a programmable logic device (PLD), for example, a field-programmable gate array (FPGA). In the reconfigurable hardware circuit, a process in which the processor loads a configuration document to implement hardware circuit configuration may be understood as a process in which the processor loads instructions to implement functions of some or all of the foregoing units. In addition, the processor may alternatively be a hardware circuit designed for artificial intelligence, and may be understood as an ASIC, for example, a neural network processing unit (NPU), a tensor processing unit (TPU), or a deep learning processing unit (DPU). In addition, the computing platform 150 may further include a memory. The memory is configured to store instructions. Some or all of the processor 151 to the processor 15*n* may invoke the instructions in the memory and execute the instructions to implement a corresponding function.

The display apparatus 130 in the cockpit is mainly classified into three categories. A first category is a vehicle-mounted display. A second category is a projection display, for example, an HUD. A third category is a holographic projection device. The vehicle-mounted display is a physical display and is an important part of a vehicle-mounted infotainment system. A plurality of displays can be disposed in the cockpit, such as a digital instrument display, a central control screen, a display in front of a passenger (also referred to as a front passenger) in a front passenger seat, a display in front of a left rear passenger, and a display in front of a right rear passenger. Even a window can be used as a display for display. The head-up display, also referred to as a head-up display system, includes a combiner head-up display (C-HUD) system, a windshield head-up display (W-HUD) system, and an augmented reality head-up display (AR-HUD) system. A holographic projection system is a display apparatus that can display a 3D image of an object. In some possible implementations, the holographic projection device may record and reproduce a 3D image of an object based on a principle of interference and diffraction of light, or may further implement a 3D effect according to a method like edge blanking or Pepper's ghost. In embodiments of the present disclosure, the holographic projection device may display an image of the 3D virtual assistant, or a 3D image of the vehicle, or may display another 3D image. This is not specifically limited in embodiments of the present disclosure. In some possible implementations, the display apparatus 130 may further display a digital human. It should be understood that the digital human may be a virtual image that has human features such as a human appearance and a character, has a language, a facial expression, and a body action expression capability, and can communicate and interact with a human. The image may be displayed by a vehicle-mounted display or the like.

It should be understood that the image displayed by the HUD is a 2D image projected on an HUD screen. The digital human displayed on the vehicle-mounted display is also included in a 2D image with a 3D effect and a depth of field. The image displayed by the holographic projection device is a 3D image. To be specific, when the holographic image is viewed from different angles, different sides of the object can be seen, resulting in a parallax effect and a deep effect.

In embodiments of the present disclosure, the processor may obtain user image information collected by the sensing system 120, and determine a location of an eye of the user and a gaze focus of the user with reference to the 3D coordinate system of the vehicle 100. When determining that the gaze focus of the user is on the display device and/or the image displayed by the display device, the display device is adjusted based on an actual location of the user in the vehicle 100. In some possible implementations, the processor may further determine a location of the user based on sound information collected by the sound sensor in the sensing system 120, and then adjust, based on the location of the user, an angle of the image projected by the holographic projection device. In some possible implementations, the user image information and the sound information may alternatively be stored in a memory of the computing platform 150 in a form of data. In some possible implementations, the processor may process the user image information and the sound information to obtain a parameterized indicator, and then adjust the display device based on the parameterized indicator. It should be understood that the foregoing operations may be performed by a same processor, or may be performed by one or more processors. This is not specifically limited in embodiments of the present disclosure.

Figure 3:
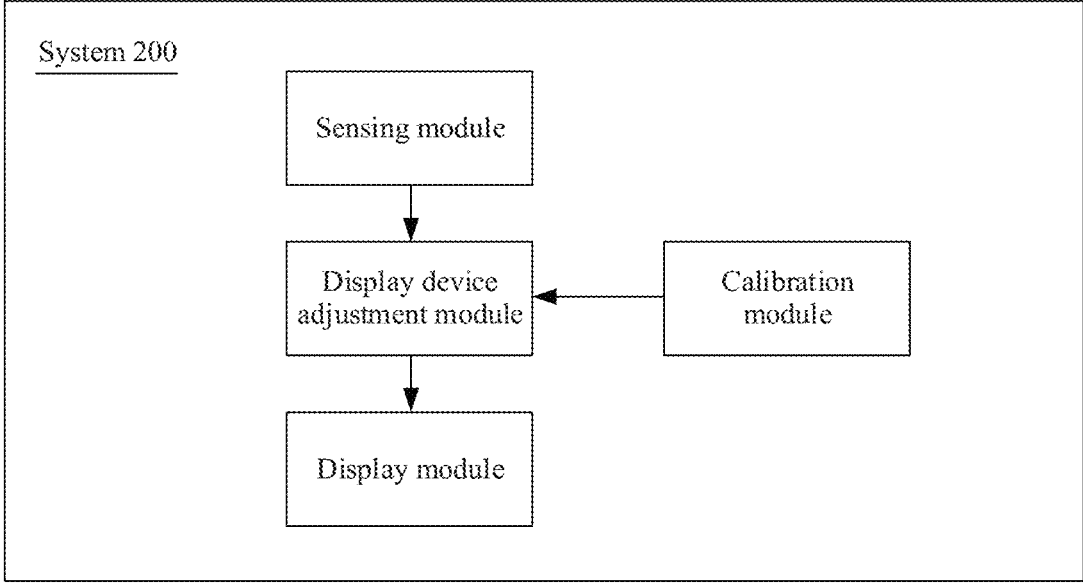
FIG. 3 is a block schematic of a system for adjusting a display device according to an embodiment of the present disclosure.

A working flow of the system for adjusting a display device is described in detail below with reference to FIG. 3. FIG. 3 is a diagram of an architecture of a system for adjusting a display device according to an embodiment of the present disclosure. The system 200 includes a sensing module, a calibration module, a display device adjustment module, and a display module. The sensing module may include one or more camera apparatuses and one or more sensors in the sensing system 120 shown in FIG. 2. The display module may include one or more display devices in the display device 130 shown in FIG. 2. The calibration module and the display device adjustment module may include one or more processors in the computing platform 150 shown in FIG. 2. Specifically, the sensing module may detect face information and/or sound information of the user. The display device adjustment module may determine an adjustment parameter based on facial image information obtained from the sensing module and an extrinsic parameter that is in a vehicle coordinate system and that is obtained from the calibration module, and then determine actual 3D coordinates of any location of the user's face in the vehicle with reference to the extrinsic parameter in the vehicle coordinate system and the facial image information. Further, the display device adjustment module may adjust the display device in the display module based on 3D coordinates of one or more feature points of the user's face. For example, a feature point of the user's face may be an eye, or may be a point between two eyes, or may be another point. This is not specifically limited in embodiments of the present disclosure.

It should be understood that the foregoing modules and apparatuses are merely examples. In actual application, the foregoing modules and apparatuses may be added or deleted based on an actual requirement. For example, the display module and the display device adjustment module in FIG. 3 may alternatively be combined into one module. In other words, functions of the display module and the display device adjustment module are implemented by one module.

As described above, display ranges of display devices in the current technical background are limited. When a user is in different locations, for the user, these display devices are not necessarily at a good display angle or location, and even a case in which imaging is incomplete and display is invisible may occur. Especially for the holographic projection device, a direction of the 3D image projected by the holographic projection device is fixed, and images seen by the user at different locations are different. Consequently, the user who wants to obtain information transmitted by the image cannot obtain related information in a timely and comprehensive manner. In view of this, embodiments of the present disclosure provide a method and an apparatus for adjusting a display device, so that a holographic projection device can be adjusted based on a location of a user, and a 3D image projected by the holographic projection device can be accurately adjusted based on the location of the user, to enhance interaction with the user, and improve driving experience of the user.

FIG. 4 shows a method for adjusting a display device according to an embodiment of the present disclosure. The method 400 may be applied to the scenario shown in FIG. 1A and FIG. 1, or may be applied to the vehicle 100 shown in FIG. 2. The method may also be performed by the system shown in FIG. 3. The method 400 includes the following steps.

S401: Obtain a first facial image of a user.

For example, after the display device is turned on, the first facial image of the user may be obtained by using a camera disposed inside the vehicle, where the first facial image includes an eye image of the user. For example, to facilitate collecting a facial image of a driver, the camera may be disposed on an A-pillar, so that the camera can capture both eyes of the user. It should be understood that the user may be any user in a cockpit of the vehicle, for example, may be a driver, may be a user in a front passenger seat, or may be a user in a rear passenger seat in the cockpit.

S402: Determine whether a gaze focus of the user is a displayed image.

Specifically, when it is determined that the gaze focus of the user is the displayed image, S403 is performed. Otherwise, S405 is performed.

In some possible implementations, if the display device is a holographic projection device, and an image projected by the holographic projection device is a virtual 3D image, whether the gaze focus of the user is on the virtual 3D image is determined.

For example, the gaze focus of the user may be determined by using a gaze estimation technology, a gaze tracking technology, or the like.

S403: Determine first location information of a facial feature point based on the first facial image.

For example, the first location information indicates a first location of the facial feature point in a vehicle coordinate system.

In some possible implementations, one facial feature point may be determined based on the first facial image, or two or more facial feature points may be determined based on the first facial image. This is not specifically limited in embodiments of the present disclosure.

For example, the facial feature point may be located in any one or more of a center of eyebrows, an eye, an eyebrow, or a nose. Alternatively, the facial feature point may be a point at another location on a face of the user. This is not specifically limited in embodiments of the present disclosure.

Further, 3D coordinates of the facial feature point in the vehicle cockpit, that is, the first location information, are determined based on image coordinates of the facial feature point in the first facial image.

In a specific implementation process, a facial feature area may alternatively be determined based on the first facial image, and then the first location information is determined based on the facial feature area. Alternatively, the first location information may be determined based on another feature point or area determined from the first facial image. This is not specifically limited in the present disclosure.

For a detailed method for determining the first location information based on the image coordinates, refer to the following description.

Figure 5:
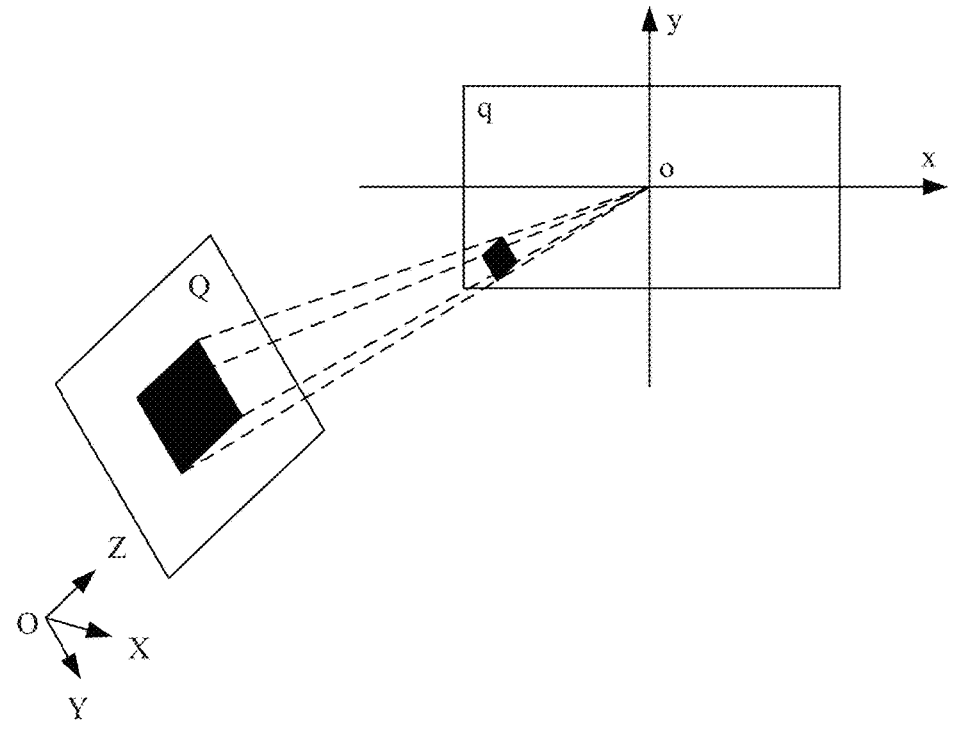
FIG. 5 is a schematic of a transformation relationship between an image coordinate system and a camera coordinate system according to an embodiment of the present disclosure.

An image coordinate system is a coordinate system established on an image captured by the camera. The image coordinate system may use a center of the image shot by the camera as an origin, and the image coordinate system is a 2D coordinate system. A camera coordinate system uses an optical center of the camera as an origin of the coordinate system. An Xc axis and a Yc axis are parallel to an x axis and a y axis of the image coordinate system. An optical axis of the camera is a Zc axis. The coordinate system meets a right-hand rule. The optical center of the camera may be understood as a geometric center of a camera lens, and the camera coordinate system is a 3D coordinate system. A transformation relationship between the image coordinate system and the camera coordinate system may be shown in FIG. 5. In FIG. 5, a 2D coordinate system o-xy is an image coordinate system of an image q shot by the camera. An intersection point of the x axis and the y axis is o, that is, o is an origin of the image coordinate system, and coordinates of any point on an image plane q may be represented by image coordinates (x, y). A 3D coordinate system O-XYZ is a camera coordinate system, and any plane in the camera coordinate system may be referred to as a spatial plane. A spatial plane Q is any plane in the spatial coordinate system (that is, the spatial plane Q is any plane in O-XYZ), and coordinates of any point on the spatial plane Q may be represented by 3D coordinates (X, Y, Z). The image plane q and the spatial plane Q have the following transformation relationship: q=sHQ. q represents image coordinates of a point on an image plane, Q represents 3D coordinates of a point on a spatial plane, s is a scale factor, and a homography matrix H=MW.

$$M = \begin{bmatrix} f_x & 0 & c_x \\ 0 & f_y & c_y \\ 0 & 0 & 1 \end{bmatrix},$$

where M represents an intrinsic parameter matrix of the camera, and $f_x$ represents a product of a physical focal length of a lens in the camera and a size of each imaged unit in the x direction, $f_y$ represents a product of the physical focal length of the lens in the camera and the size of each imaged unit in the y direction, $c_x$ represents an offset of a projection coordinate center relative to an optical axis in the x direction, and $c_y$ represents an offset of the projection coordinate center relative to the optical axis in the y direction. Each cell size of imaging may be one pixel in the image shot by the camera.

W=[R, t], and W is an extrinsic parameter matrix of the camera. R is a 3*3 orthogonal identity matrix, also referred to as a rotation matrix, and t is a 3D translation vector. If the image plane q has the foregoing transformation relationship with the spatial plane Q, and image coordinates, a scale factor, and a homography matrix H of a point on q are known, spatial coordinates of the point on Q may be calculated based on the foregoing transformation relationship between the image plane and the spatial plane.

For example, in FIG. 5, image coordinates of a point on the plane q are $(x_1, y_1)$. If the intrinsic parameter matrix of the camera is M, the physical transformation matrix of the extrinsic parameter of the camera is W, and the scale factor is s, an equation with $X_1, Y_1, Z_1$ as unknown numbers may be obtained based on the transformation relationship between the image plane and the world plane:

$$\begin{bmatrix} x_1 \\ y_1 \\ 1 \end{bmatrix} = sH \begin{bmatrix} X_1 \\ Y_1 \\ Z_1 \\ 1 \end{bmatrix},$$

where H=MW, and the coordinates $(X_1, Y_1, Z_1)$ of the point on the world plane Q may be obtained by solving the equation.

Further, the coordinates $(X_1, Y_1, Z_1)$ of the point on the spatial plane Q are converted into the vehicle coordinate system to obtain 3D coordinates $(X_2, Y_2, Z_2)$ of the point in the vehicle coordinate system.

For example, the 3D coordinates $(X_2, Y_2, Z_2)$ may be determined by a perspective-n-point (PnP) algorithm based on a prior head model. The prior head model includes a relationship between coordinates of a specified point in the vehicle coordinate system and the image coordinate system. Specifically, coordinates of a specified point in the vehicle coordinate system and the camera coordinate system have a following relationship:

$$\omega p = KP^C = K(R_{CW} \times P^W + t_{CW}^C),$$

where p is coordinates of the point in a pixel coordinate system, $P^C$ is coordinates of the point in the camera coordinate system, $P^W$ is coordinates of the point in the vehicle coordinate system, $\omega$ is a depth of the point, K is an intrinsic parameter matrix of the camera, and $$R_{CW} \text{ and } t_{CW}^C$$

are a posture conversion from the vehicle coordinate system to the camera coordinate system. More specifically, $R_{CW}$ is a rotation matrix from the vehicle coordinate system to the camera coordinate system (a representation of a same vector in the vehicle coordinate system is converted into a representation in the camera coordinate system), and $$t_{CW}^C$$

is a corresponding translation vector (that is, a representation in the camera coordinate system of a vector pointing from the origin of the camera coordinate system to the origin of the vehicle coordinate system). Further, $R_{CW}$ and $$t_{CW}^C$$

can be solved based on coordinates of n points in the prior head model in the vehicle coordinate system and coordinates of the n points in the image coordinate system. Further, the 3D coordinates $(X_2, Y_2, Z_2)$ of the facial feature point in the vehicle coordinate system may be obtained based on the coordinates $(X_1, Y_1, Z_1)$ of the facial feature point in the camera coordinate system.

In some possible implementations, a 3D location of a corresponding location of a human face may be obtained by using a facial key point detection algorithm, and then 3D coordinates $(X_2, Y_2, Z_2)$ of the facial feature point in the vehicle coordinate system are determined. Alternatively, a head reconstruction algorithm may be used to directly reconstruct a head of the user in real time, to determine 3D coordinates $(X_2, Y_2, Z_2)$ of the facial feature point in the vehicle coordinate system.

It should be understood that the 3D coordinates of the facial feature point in the cockpit can provide a more accurate reference basis for adjusting the display device.

S404: Adjust a display direction of the display device based on the first location information.

Figure 6A:
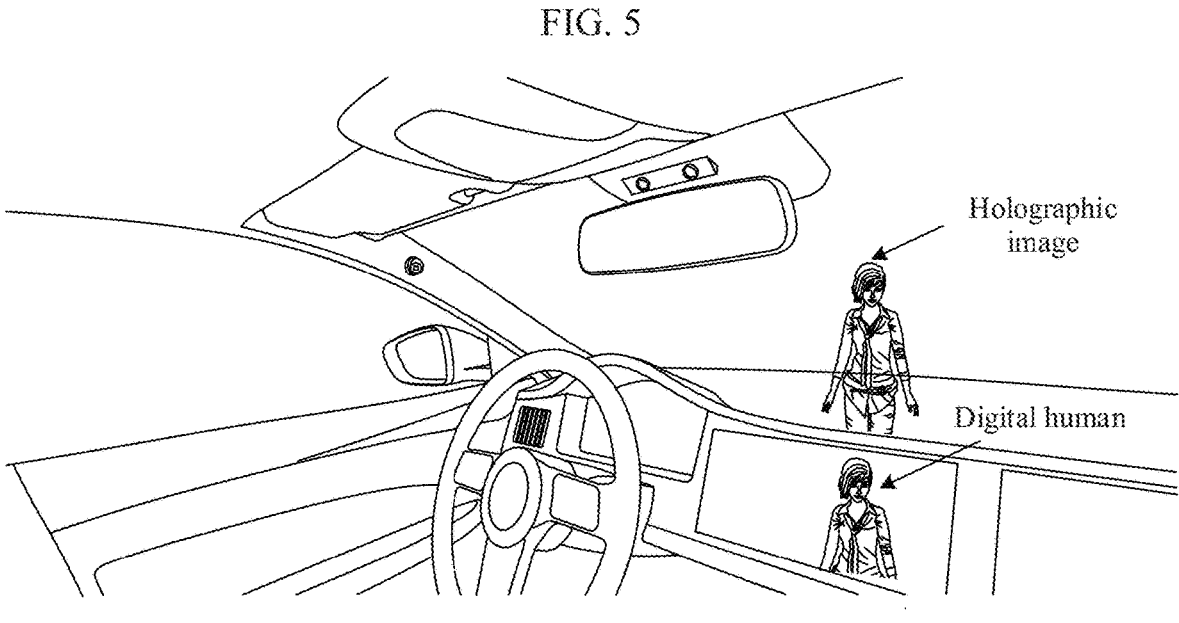
FIG. 6A to FIG. 6E are a schematic of an application scenario of adjusting an image displayed by a display device according to an embodiment of the present disclosure.

For example, the display apparatus in embodiments of the present disclosure is a holographic projection device, and an image displayed by the display apparatus is a 3D image. For example, a direction of a holographic image displayed by the display apparatus may be adjusted based on the first location information, so that a side of the holographic image that includes content to be communicated to the user faces the user. For example, when the holographic image is a 3D image of a virtual assistant, a face of the virtual assistant, or a body and a face of the virtual assistant may be adjusted to face the user. As shown in FIG. 6A, when the user is a user in a front passenger seat, the holographic image of the virtual assistant displayed may be adjusted to face the user in the front passenger seat. In some possible implementations, a face orientation of the digital human displayed by the display device may be adjusted based on the first location information.

Figures 6B, 6C, 6D, 6E:
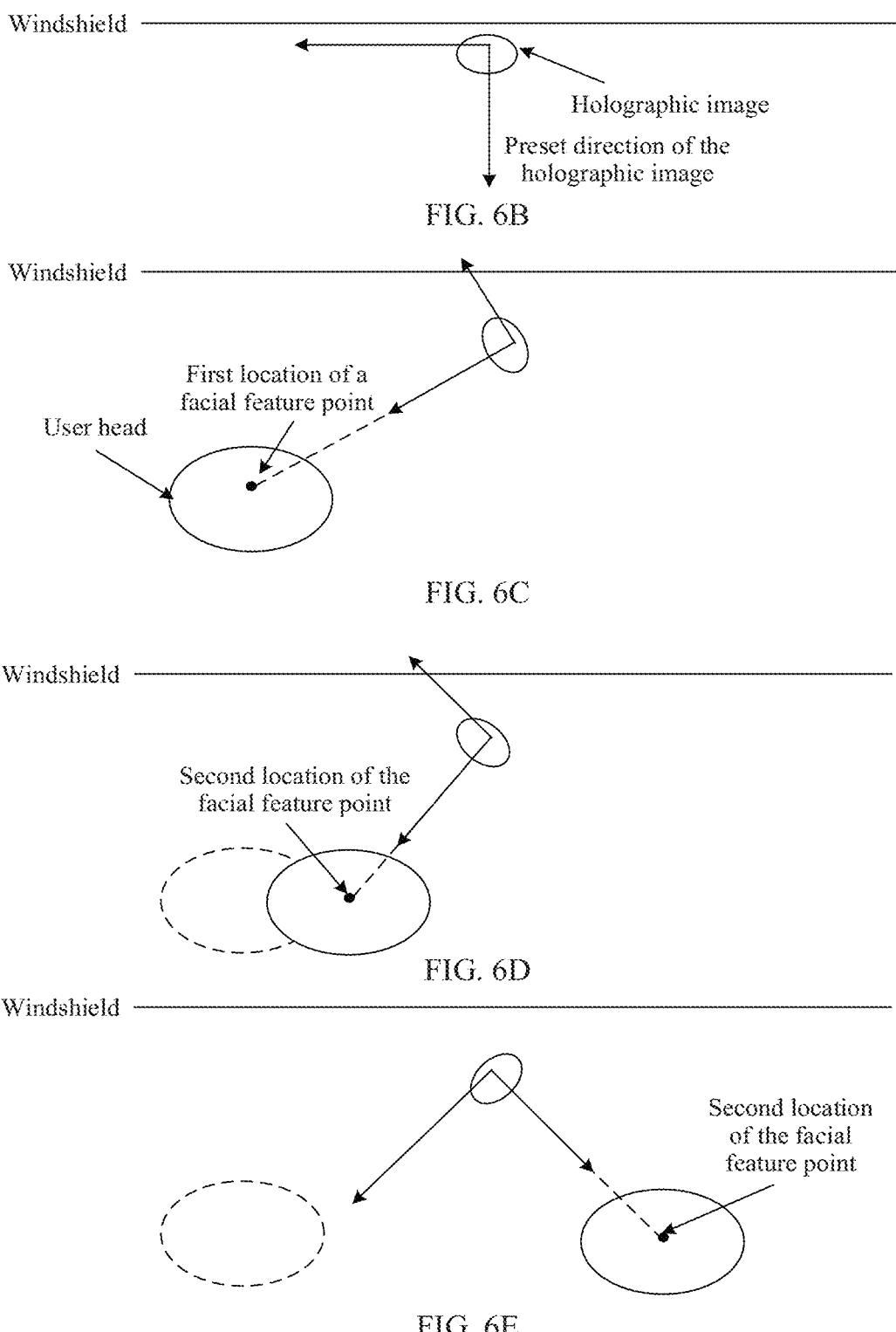

In some possible implementations, a preset direction of the holographic image displayed by the display device may be shown in FIG. 6B. For example, when the holographic image is a virtual assistant, the preset direction may be a face orientation of the virtual assistant. When the holographic image is another image, the preset direction may be a direction of a side that includes the content to be communicated to the user.

Further, the adjusting a display direction of the display device based on the first location information may include: adjusting a posture of the holographic image, so that a side of the holographic image that includes the content to be communicated to the user is turned to a first location of the facial feature point of the user, that is, the preset direction shown in FIG. 6B is directed to the first location of the facial feature point, which is specifically shown in FIG. 6C.

In some possible implementations, the posture of the holographic image may be adjusted by adjusting an angle of the holographic projection device. For example, the holographic projection device includes a projection apparatus and an imaging apparatus, where the projection apparatus projects light to the imaging apparatus, so that the imaging apparatus can render a 3D stereoscopic image. In some possible implementations, when the projection apparatus rotates, the 3D stereoscopic image rotates. In this case, a rotation angle of the projection apparatus in a plane perpendicular to a longitudinal symmetry plane of the vehicle may be adjusted based on the first location information, so that a side of the holographic image that includes the content to be communicated to the user faces the user. In some possible implementations, there is a mapping relationship between angle transformation of the holographic projection device and angle transformation of the holographic image. For example, when the holographic projection device rotates clockwise by a degrees (°) in the plane perpendicular to the longitudinal symmetry plane of the vehicle, the holographic image may rotate by β degrees clockwise in the plane perpendicular to the longitudinal symmetry plane of the vehicle. α and ρ may be equal or unequal. This is not limited in embodiments of the present disclosure.

For example, the preset direction shown in FIG. 6B indicates an initial posture of the holographic image. The preset direction indicates a posture angle of the holographic image as 0 degrees, coordinates of the holographic image in the vehicle coordinate system are $(X_3, Y_3, Z_3)$, and coordinates of the first location shown in FIG. 6C in the vehicle coordinate system are $(X_4, Y_4, Z_4)$. In this case, it may be determined, based on the first location information and the initial posture of the holographic image, that a first rotation angle $\theta_1$ is $\arctan((X4-X3)/(Y4-Y3))$, where a first rotation direction rotates clockwise in the plane perpendicular to the longitudinal symmetry plane of the vehicle. Further, based on the mapping relationship between the angle transformation of the holographic projection device and the angle transformation of the holographic image, a rotation angle $\theta_2$ of the holographic projection device is determined. Then the holographic projection device is controlled to rotate clockwise at $\theta_2$ in the plane perpendicular to the longitudinal symmetry plane of the vehicle, so that the side of the holographic image that includes the content to be communicated to the user faces the user.

For example, the projection apparatus may implement synchronous playback of a digital high-definition multi-channel hard disk. The imaging apparatus may include a spectroscope. Alternatively, the projection apparatus and the imaging apparatus may include another apparatus. This is not specifically limited in embodiments of the present disclosure.

In some possible implementations, the posture of the 3D stereoscopic image may be further adjusted based on the first location information. For example, when the 3D stereoscopic image is a virtual assistant, a direction of a head and/or a body of the virtual assistant may be adjusted, so that the head of the virtual assistant faces the first location.

In some possible implementations, a height of the image displayed by the holographic projection device may be further adjusted based on the first location information. For example, the height of the image displayed by the holographic projection device is adjusted based on height information in the first location information, to control the holographic projection device to display the holographic image at a corresponding height. For example, the rotation angle of the projection apparatus in the plane parallel to the vehicle longitudinal symmetry plane may be controlled based on the height information in the first location information, and thus the height of the holographic image may be controlled.

S405: Obtain a second facial image of the user, and determine second location information of the facial feature point based on the second facial image.

For example, the second location information indicates a second location of the facial feature point in the vehicle coordinate system.

In some possible implementations, when the user interacts with the holographic image, and a head location of the user changes, the second facial image of the user may be obtained, and the second location information of the facial feature point is determined based on the second facial image. Specifically, for a method for determining the second location information of the facial feature point, refer to the description in S403.

S406: Determine whether a distance difference between the first location and the second location is greater than or equal to a first threshold.

Specifically, when it is determined that the distance difference between the first location and the second location is greater than or equal to the first threshold, S407 is performed. Otherwise, S408 is performed.

It should be understood that, when the distance difference is greater than or equal to the preset threshold, display device adjustment is triggered, so that frequent adjustment of the display device can be avoided.

For example, the first threshold may be 15 cm, 20 cm, or may be another distance. This is not specifically limited in embodiments of the present disclosure.

S407: Adjust the display direction of the display device based on the second location information.

In some possible implementations, both the first location and the second location are locations of the facial feature point of the first user (for example, a user on the driver seat) in the vehicle coordinate system. Therefore, adjusting the display direction of the display device based on the second location information may be shown in FIG. 6D.

In some possible implementations, the first location is a location of a facial feature point of the first user (for example, a user at the driver seat) in the vehicle coordinate system, and the second location is a location of a facial feature point of the second user (for example, a user at the front passenger seat) in the vehicle coordinate system. Therefore, adjusting the display direction of the display device based on the second location information may be shown in FIG. 6E. For example, when the second location and the first location indicate different users, determining of the second location may be actively triggered by the second user. For example, the second user triggers based on a voice instruction, for example, "holographic image, please face me". Alternatively, the second user triggers by using a related button, for example, the second user taps a button for "opening holographic image".

For example, an angle and a direction that the display device needs to rotate may be determined based on the first location information and the second location information, and then the display device is controlled to rotate, so that the display direction of the display device faces the second location. In some possible implementations, the display device rotates in the plane perpendicular to the longitudinal symmetry plane of the vehicle.

S408: End.

It should be understood that the foregoing "end" represents ending the process of adjusting the display device.

The steps or operations of the method for controlling the display apparatus shown in FIG. 4 are merely examples for description. In embodiments of the present disclosure, another operation or a variation of each operation in FIG. 4 may be further performed. In addition, the steps in FIG. 4 may be performed in a sequence different from that shown in FIG. 4, and some operations in FIG. 4 may not need to be performed. For example, S405 to S407 may not be performed. For example, S402 may be skipped, and S403 may be directly performed.

According to the method for adjusting a display device provided in embodiments of the present disclosure, the display direction of the display device can be adjusted based on the 3D coordinates of the feature point of the head of the user in the vehicle coordinate system, so that the orientation of the image displayed by the display device can be accurately adjusted, to provide better interaction effect for the user, and improve interaction experience of the user.

Figures 7, 8A:
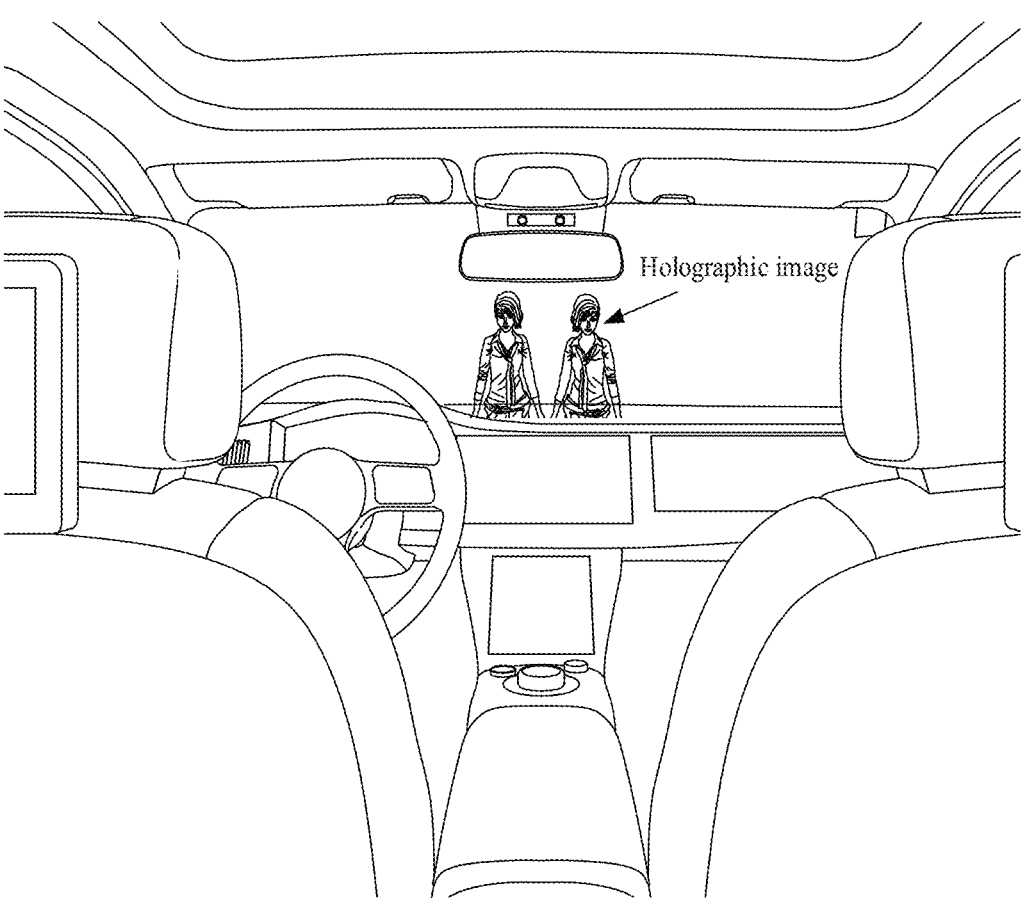

FIG. 7 shows a method for adjusting a display device according to an embodiment of the present disclosure. The method 700 may be applied to the scenario shown in FIG. 1A and FIG. 1*i*, or may be applied to the vehicle 100 shown in FIG. 2. The method may also be performed by the system shown in FIG. 3. The steps or operations of the method for controlling the display apparatus shown in FIG. 7 are merely examples for description. In embodiments of the present disclosure, another operation or a variation of each operation in FIG. 4 may be further performed. The method 700 includes the following steps.

S701: Obtain audio data inside a vehicle, and determine a sound source location of the audio data.

For example, the audio information may be audio information obtained after various invalid audio information is excluded from collected audio information inside the vehicle, and the invalid audio information may be audio information with an excessively low volume. The sound source location may be a location of a sound source corresponding to the audio information. The sound source location may be a relative location to a light display device based on positioning of the sound source, or may be specific location coordinates. This is not specifically limited in embodiments of the present disclosure.

For example, the sound source location may be determined based on a time difference of arrival (TDOA) principle and audio information collected by a plurality of sound sensors. For example, a sound sensor A and a sound sensor B respectively detect that audio is emitted from a sound source S. A time when a sound source signal of the sound source S arrives at the sound sensor A is t1, and a time when the sound source signal of the sound source S arrives at the sound sensor B is t2, so a time difference is dt=|t1−t2|. If a distance between the sound source S and the sound sensor A is set to AS, a distance between the sound source S and the sound sensor B is set to BS, and a speed of sound is set to c, dt=t1−t2=AS/c−BS/c may be obtained. Then, one of the sensors is selected as a reference point, and the location of the sound source can be determined based on a distance a between the two sound sensors.

In some possible implementations, the audio information may be a voice that includes a specific wake-up word, for example, "starting a display device", or "virtual assistant, please face me", or other voice information.

S702: Determine a location of a user based on the sound source location.

In some possible implementations, in preset duration, two sound source locations are determined based on the obtained audio data. For example, if the sound source locations are determined to be at a driver seat and at a front passenger seat respectively, the display device may be controlled to perform image "copying". As shown in FIG. 8A, two images obtained after copying respectively face a user at the driver seat and a user at the front passenger seat. For example, the image is a 3D image of the virtual assistant, and two copied images are controlled by a same instruction.

In some possible implementations, in preset duration, two sound source locations are determined based on the obtained audio data. For example, if the sound source locations are determined to be at a driver seat and at a front passenger seat respectively, the display device may be controlled to display two images, and the two images are controlled to face a user at the driver seat and a user at the front passenger seat respectively.

For example, the preset duration may be 3 seconds, or 5 seconds, or may be other preset duration.

In some possible implementations, the display device is disposed at an armrest in the middle of front seats. When it is determined that the sound source locations are respectively at a rear left seat and at a rear right seat, the display device may be controlled to project two images, and the two images face a user at the rear left seat and a user at the rear right seat respectively.

In some possible implementations, when a quantity of users is greater than 2, the display device may be controlled to project a plurality of images, and the plurality of images may be adjusted to face the plurality of users respectively.

In some possible implementations, after the location of the user is determined based on the sound source location, the display device may be adjusted, so that the image projected by the display device moves to the sound source location. For example, if the sound source location is at a front passenger seat, the display device may be adjusted to move the location of the image to the front passenger seat, as shown in FIG. 8B.

In some possible implementations, the holographic projection device includes a projection apparatus and an imaging apparatus, where the projection apparatus projects light to the imaging apparatus, so that the imaging apparatus can render a 3D stereoscopic image. In some possible implementations, a location of the imaging apparatus is adjusted to the front passenger seat, and then a projection angle of the projection apparatus is adaptively adjusted, to form a holographic image at the front passenger seat.

According to the method for adjusting a display device provided in embodiments of the present disclosure, in a multi-user scenario, when a user sends a voice instruction, it may be determined, based on a sound source location, whether the user sending the instruction is a driver, a front passenger, or a rear passenger, and then the display device is correspondingly adjusted, so that a 3D image projected by the display device faces the user, and interaction between the user and the image projected by the display device is improved. In the multi-user scenario, the display device may further copy the image, so that each image faces one of the plurality of users, to further improve interaction experience and driving interest of the user.

FIG. 9 shows a method for adjusting a display device according to an embodiment of the present disclosure. The method 900 may be applied to the scenario shown in FIG. 1A and FIG. 1B, or may be applied to the vehicle 100 shown in FIG. 2. The method may also be performed by the system shown in FIG. 3. The steps or operations of the method for controlling the display apparatus shown in FIG. 9 are merely examples for description. In embodiments of the present disclosure, another operation or a variation of each operation in FIG. 4 may be further performed. The method 900 includes the following steps.

S901: Obtain a first facial image of a first user.

Specifically, for a method for obtaining the first facial image of the first user, refer to the description in the foregoing embodiment.

S902: Determine first spatial coordinates of a facial feature point of the first user based on the first facial image.

In some possible implementations, the first spatial coordinates may be 3D coordinates of the facial feature point of the first user in a vehicle coordinate system.

For example, the facial feature point of the first user may be the point in the foregoing embodiment. Further, for a method for determining the first spatial coordinates, refer to the description in the foregoing embodiment.

S903: Adjust, based on the first spatial coordinates, an orientation of a first side of an image displayed by the display device, where the first side of the image includes information to be communicated to the first user.

For example, the image may be a holographic image, or may be a binary image with a 3D effect and a depth of field. This is not specifically limited in embodiments of the present disclosure.

Specifically, for a method for adjusting, based on the first spatial coordinates, the orientation of the image displayed by the display device, refer to the description in the foregoing embodiment.

According to the method for adjusting a display device provided in embodiments of the present disclosure, a user can experience interaction with the display device, and user experience at an interaction level is improved.

In various embodiments of the present disclosure, unless otherwise stated or there is a logic conflict, terms and/or descriptions in each embodiment are consistent and may be mutually referenced, and technical features in different embodiments may be combined based on an internal logical relationship thereof, to form a new embodiment.

The foregoing describes in detail the method provided in embodiments of the present disclosure with reference to FIG. 4 to FIG. 9. The following describes in detail an apparatus provided in an embodiment of the present disclosure with reference to FIG. 10 and FIG. 11. It should be understood that descriptions of apparatus embodiments correspond to the descriptions of the method embodiments. Therefore, for content that is not described in detail, refer to the foregoing method embodiments. For brevity, details are not described herein again.

FIG. 10 is a block schematic of an apparatus 2000 for adjusting a display device according to an embodiment of the present disclosure. The apparatus 2000 includes an obtaining unit 2010 and a processing unit 2020. The obtaining unit 2010 may implement a corresponding communication function, and the processing unit 2020 is configured to process data.

Optionally, the apparatus 2000 may further include a storage unit, the storage unit may be configured to store instructions and/or data, and the processing unit 2020 may read the instructions and/or the data in the storage unit, so that the apparatus implements the foregoing method embodiments.

The apparatus 2000 may include units configured to perform the methods in FIG. 4, FIG. 7, and FIG. 9. In addition, the units in the apparatus 2000 and the foregoing other operations and/or functions are separately used to implement corresponding procedures of the method embodiments in FIG. 4, FIG. 7, and FIG. 9.

When the apparatus 2000 is configured to perform the method 900 in FIG. 9, the obtaining unit 2010 may be configured to perform S901 in the method 900, and the processing unit 2020 may be configured to perform S902 and S903 in the method 900.

The apparatus 2000 includes: the obtaining unit 2010 configured to obtain a first facial image of a first user; and the processing unit 2020 configured to: determine first spatial coordinates of a facial feature point of the first user based on the first facial image; and adjust, based on the first spatial coordinates, an orientation of a first side of an image displayed by the display device, where the first side of the image includes information to be communicated to the first user.

Optionally, the obtaining unit 2010 is further configured to: after the orientation of the first side of the image displayed by the display device is adjusted based on the first spatial coordinates, obtain a second facial image of a second user. The processing unit 2020 is further configured to: determine second spatial coordinates of a facial feature point of the second user based on the second facial image; and adjust, based on the second spatial coordinates, the orientation of the first side of the image displayed by the display device.

Optionally, the obtaining unit 2010 is further configured to: after the orientation of the first side of the image displayed by the display device is adjusted based on the first spatial coordinates, obtain a third facial image of the first user. The processing unit 2020 is further configured to: determine third spatial coordinates of the facial feature point of the first user based on the third facial image; and when a distance between the first spatial coordinates and the third spatial coordinates is greater than or equal to a preset threshold, adjust, based on the third spatial coordinates, the orientation of the first side of the image displayed by the display device.

Optionally, the obtaining unit 2010 is further configured to: before obtaining the first facial image of the first user, obtain audio information, where the audio information includes a voice instruction of the first user, and the voice instruction indicates to start and/or adjust the display device. The processing unit 2020 is further configured to: determine a sound source location of the audio information; and determine a location of the first user based on the sound source location.

Optionally, the audio information further includes a voice instruction of the second user, and the processing unit 2020 is further configured to: control the display device to display a first image and a second image; and adjust the display device so that a first side of the first image faces the first user and a first side of the second image faces the second user, where the image displayed by the display device includes the first image and/or the second image, the first side of the first image includes information to be communicated to the first user, and the first side of the second image includes information to be communicated to the second user.

Optionally, the processing unit 2020 is further configured to adjust, based on the first spatial coordinates, a location of the image displayed by the display device.

Optionally, the obtaining unit 2010 is further configured to: before the orientation of the first side of the image displayed by the display device is adjusted based on the first spatial coordinates, obtain initial posture information of the display device, where the initial posture information indicates a posture angle and a location of the display device. The processing unit 2020 is further configured to: determine a rotation angle and a rotation direction of the display device based on the first spatial coordinates and the initial posture information; and adjust, based on the rotation angle and the rotation direction, the orientation of the first side of the image displayed by the display device.

Optionally, the first spatial coordinates of the facial feature point of the first user indicate a 3D location of the facial feature point of the first user in a vehicle, and the vehicle includes the display device.

Optionally, the display device includes a holographic projection device, and the image includes a 3D image.

It should be understood that division into the units in the apparatus is merely logical function division. During actual implementation, all or some of the units may be integrated into one physical entity or may be physically separated. In addition, the units in the apparatus may be implemented in a form of software invoked by the processor. For example, the apparatus includes a processor, the processor is connected to a memory, the memory stores instructions, and the processor invokes the instructions stored in the memory, to implement any one of the foregoing methods or implement functions of each unit of the apparatus. The processor is, for example, a general purpose processor, such as a CPU or a microprocessor. The memory is a memory inside the apparatus or a memory outside the apparatus. Alternatively, the units in the apparatus may be implemented in a form of hardware circuits, and functions of some or all units may be implemented by designing the hardware circuits. The hardware circuit may be understood as one or more processors. For example, in an implementation, the hardware circuit is an ASIC, and functions of some or all of the foregoing units are implemented by designing a logical relationship between elements in the circuit. For another example, in another implementation, the hardware circuit may be implemented by using a PLD. Using an FPGA as an example, the hardware circuit may include a large quantity of logic gate circuits, and a connection relationship between the logic gate circuits is configured by using a configuration file, to implement functions of some or all of the foregoing units. All units of the foregoing apparatuses may be implemented in a form of software invoked by a processor, or all units may be implemented in a form of a hardware circuit, or some units may be implemented in a form of software invoked by a processor, and a remaining part may be implemented in a form of a hardware circuit.

In embodiments of the present disclosure, the processor is a circuit that has a signal processing capability. In an implementation, the processor may be a circuit that has an instruction reading and running capability, for example, a CPU, a microprocessor, a GPU, or a DSP. In another implementation, the processor may implement a specific function by using a logical relationship of a hardware circuit. The logical relationship of the hardware circuit is fixed or reconfigurable. For example, the processor is a hardware circuit implemented by an ASIC or a PLD, for example, an FPGA. In the reconfigurable hardware circuit, a process in which the processor loads a configuration document to implement hardware circuit configuration may be understood as a process in which the processor loads instructions to implement functions of some or all of the foregoing units. In addition, the processor may be a hardware circuit designed for artificial intelligence, and may be understood as an ASIC, for example, an NPU, a TPU, or a DPU.

It can be learned that each unit in the foregoing apparatus may be one or more processors (or processing circuits) configured to implement the foregoing method, for example, a CPU, a GPU, an NPU, a TPU, a DPU, a microprocessor, a DSP, an ASIC, an FPGA, or a combination of at least two of these processor forms.

In addition, all or some of the units in the foregoing apparatus may be integrated, or may be independently implemented. In an implementation, the units are integrated and implemented in a form of a system-on-a-chip (SOC). The SOC may include at least one processor configured to implement any one of the foregoing methods or implement functions of each unit of the apparatus. Types of the at least one processor may be different, including, for example, a CPU and an FPGA, a CPU and an artificial intelligence processor, a CPU and a GPU, and the like.

In a specific implementation process, operations performed by the obtaining unit 2010 and the processing unit 2020 may be performed by a same processor, or may be performed by different processors, for example, separately performed by a plurality of processors. In an example, the one or more processors may be connected to one or more sensors in the sensing system 120 in FIG. 2, to obtain and process a facial image of a user from the one or more sensors. In another example, the one or more processors may be further connected to one or more display devices in the display apparatus 130, to control an orientation of an image displayed by the display device. For example, in a specific implementation process, the one or more processors may be disposed in a processor in a vehicle-mounted head unit, or may be a processor disposed in another vehicle-mounted terminal. For example, in a specific implementation process, the apparatus 2000 may be a chip disposed in a vehicle-mounted head unit or another vehicle-mounted terminal. For example, in a specific implementation process, the apparatus 2000 may be the computing platform 150 shown in FIG. 2 disposed in the vehicle.

FIG. 11 is a block schematic of an apparatus for adjusting a display device according to an embodiment of the present disclosure. The apparatus 2100 for adjusting a display device shown in FIG. 11 may include a processor 2110, a transceiver 2120, and a memory 2130. The processor 2110, the transceiver 2120, and the memory 2130 are connected through an internal connection path. The memory 2130 is configured to store instructions. The processor 2110 is configured to execute the instructions stored in the memory 2130, so that the transceiver 2120 receives/sends some parameters. Optionally, the memory 2130 may be coupled to the processor 2110 through an interface, or may be integrated with the processor 2110.

It should be noted that the transceiver 2120 may include but is not limited to a transceiver apparatus such as an input/output interface (input/output interface), to implement communication between the apparatus 2100 and another device or a communication network.

The processor 2110 may be a general-purpose CPU, a microprocessor, an ASIC, a GPU, or one or more integrated circuits, and is configured to execute a related program, to implement the method for adjusting a display device in the method embodiments of the present disclosure. The processor 2110 may be an integrated circuit chip and has a signal processing capability. In a specific implementation process, steps of the method for adjusting a display device in the present disclosure may be completed by using an integrated logic circuit of hardware in the processor 2110 or by using an instruction in a form of software. Alternatively, the processor 2110 may be a general-purpose processor, a DSP, an ASIC, an FPGA or another programmable logic device, a discrete gate or transistor logic device, or a discrete hardware component. The processor 2110 may implement or execute the methods, steps, and logical block diagrams disclosed in embodiments of the present disclosure. The general-purpose processor may be a microprocessor, or the processor may be another processor or the like. Steps of the methods disclosed with reference to embodiments of the present disclosure may be directly executed and accomplished by using a hardware decoding processor, or may be executed and accomplished by using a combination of hardware and software modules in the decoding processor. The software module may be located in a mature storage medium in the art, such as a random-access memory (RAM), a flash memory, a read-only memory (ROM), a programmable ROM (PROM), an electrically erasable PROM (EEPROM), or a register. The storage medium is located in the memory 2130. The processor 2110 reads information in the memory 2130, and performs the method for adjusting a display device in the method embodiments of the present disclosure in combination with hardware of the processor 2110.

The memory 2130 may be a ROM, a static storage device, a dynamic storage device, or a RAM.

The transceiver 2120 uses a transceiver apparatus, for example, but not limited to, a transceiver, to implement communication between the apparatus 2100 and another device or a communication network. For example, the facial image and/or audio information of the user may be obtained by using the transceiver 2120.

An embodiment of the present disclosure further provides a vehicle. The vehicle may include the foregoing apparatus 2000 or the foregoing apparatus 2100, and the foregoing display device. The display device may be a holographic projection device, and a displayed image may be a 3D image. Alternatively, the display device may be a vehicle-mounted display, and a displayed image may be a digital human. Alternatively, the display device may be another display device. This is not specifically limited in the present disclosure.

An embodiment of the present disclosure further provides a computer program product. The computer program product includes computer program code, and when the computer program code is run on a computer, the computer is enabled to perform the method.

An embodiment of the present disclosure further provides a computer-readable storage medium. The computer-readable storage medium stores program code. When the computer program code is run on a computer, the computer is enabled to perform any one of the methods in FIG. 4, FIG. 7, and FIG. 9.

An embodiment of the present disclosure further provides a chip, including at least one processor and a memory. The at least one processor is coupled to the memory, and is configured to read and execute instructions in the memory, to perform any one of the methods in FIG. 4, FIG. 7, and FIG. 9.

Each aspect, embodiment, or feature is presented in the present disclosure with reference to a system including a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may also be used.

In addition, in embodiments of the present disclosure, terms such as "for example" and "such as" are used to represent giving an example, an illustration, or description. Any embodiment or design scheme described as an "example" in the present disclosure should not be explained as being more preferred or having more advantages than another embodiment or design scheme. Specifically, the term "example" is used for presenting a concept in a specific manner.

In embodiments of the present disclosure, "relevant (corresponding, relevant)" and "corresponding" may sometimes be mixed. It should be noted that meanings to be expressed by the two are consistent when a difference between them is not emphasized.

A network architecture and a service scenario described in embodiments of the present disclosure are intended to describe the technical solutions in embodiments of the present disclosure more clearly, and do not constitute a limitation on the technical solutions provided in embodiments of the present disclosure. A person of ordinary skill in the art may know that with evolution of the network architecture and emergence of a new service scenario, the technical solutions provided in embodiments of the present disclosure are also applicable to similar technical problems.

Reference to "one embodiment" or "some embodiments" described in this specification or the like means that one or more embodiments of the present disclosure include a particular feature, structure, or characteristic described in combination with the embodiment. Therefore, statements such as "in an embodiment", "in some embodiments", "in some other embodiments", and "in other embodiments" that appear at different places in this specification do not necessarily mean reference to a same embodiment, instead, they mean "one or more but not all of embodiments", unless otherwise specifically emphasized. The terms "include", "comprise", "have", and their variants all mean "include but are not limited to", unless otherwise specifically emphasized.

In the present disclosure, "at least one" refers to one or more, and "a plurality of" refers to two or more. The term "and/or" describes an association relationship for describing associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present disclosure, it should be understood that the disclosed system, apparatus, and method may be implemented in other manners. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communications connections between the apparatuses or units may be implemented in electrical, mechanical, or other forms.

The units described as separate components may or may not be physically separate, and parts displayed as units may or may not be physical units, may be located in one place, or may be distributed on a plurality of network units. Some or all of the units may be selected based on actual requirements to achieve the objectives of the solutions of embodiments.

In addition, function units in embodiments of the present disclosure may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, all or some of the technical solutions of the present disclosure may be implemented in a form of a software product. The software product is stored in a storage medium, and includes several instructions for instructing a computer device (which may be a personal computer, a server, or a network device) to perform all or some of the steps of the methods described in the embodiments. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method, the method comprising:
displaying a first image;
obtaining a first facial image of a first user;
adjusting, based on first spatial coordinates of a first facial feature point of the first user, an orientation of a first side of the first image, wherein the first spatial coordinates are based on the first facial image, and wherein the first side comprises first information to be communicated to the first user;
obtaining a second facial image of the first user; and
adjusting, when a distance between the first spatial coordinates and second spatial coordinates of the first facial feature point is greater than or equal to a preset threshold, the orientation of the first side based on the second spatial coordinates, wherein the second spatial coordinates are based on the second facial image.

2. The method according to claim 1, wherein after adjusting, based on the first spatial coordinates, the orientation, the method further comprises:
obtaining a third facial image of a second user;
determining third spatial coordinates of a second facial feature point of the second user based on the third facial image; and
adjusting, based on the third spatial coordinates, the orientation of the first side.

3. The method according to claim 1, wherein prior to obtaining the first facial image, the method further comprises:
obtaining audio information comprising a first voice instruction of the first user that indicates to start or adjust a display device;
determining a sound source location of the audio information;
determining a location of the first user based on the sound source location; and
further obtaining the first facial image based on the location.

4. The method according to claim 3, wherein the audio information further comprises a second voice instruction of a second user, and wherein the method further comprises:
controlling the display device to display the first image and a second image; and
adjusting the display device so that the first side faces the first user and a second side of the second image faces the second user, wherein the second side comprises second information to be communicated to the second user.

5. The method according to claim 1, wherein the method further comprises adjusting, based on the first spatial coordinates, a location of the first image.

6. The method according to claim 1, wherein prior to adjusting the orientation of the first side, the method further comprises:
obtaining initial posture information indicating a posture angle and a location of a display device;
determining a rotation angle and a rotation direction of the display device based on the first spatial coordinates and the initial posture information; and
further adjusting, based on the rotation angle and the rotation direction, the orientation of the first side.

7. The method according to claim 1, wherein the first spatial coordinates indicate a three-dimensional (3D) location of the first facial feature point in a vehicle comprising a display device.

8. The method according to claim 1, wherein a display device comprises a holographic projection device, and wherein the first image comprises a three-dimensional (3D) image.

9. An apparatus comprising:
a memory configured to store instructions; and
one or more processors coupled to the memory and configured to execute the instructions to cause the apparatus to:
display a first image;
obtain audio information comprising a voice instruction of a first user that indicates to start or adjust a display device;
obtain a first facial image of a first the first user based on a first location of the first user, wherein the first location is based on a sound source location of the audio information; and
adjust, based on first spatial coordinates of a first facial feature point of the first user, an orientation of a first side of the first image, wherein the first spatial coordinates are based on the first facial image, and wherein the first side comprises first information to be communicated to the first user.

10. The apparatus according to claim 9, wherein after adjusting, based on the first spatial coordinates, the orientation, the one or more processors are further configured to execute the instructions to cause the apparatus to:
obtain a second facial image of a second user;

determine second spatial coordinates of a second facial feature point of the second user based on the second facial image; and adjust, based on the second spatial coordinates, the orientation of the first side.

11. The apparatus according to claim 9, wherein after adjusting, based on the first spatial coordinates, the orientation, the one or more processors are further configured to execute the instructions to cause the apparatus to:

obtain a second facial image of the first user;

determine second spatial coordinates of the first facial feature point based on the second facial image; and adjust, when a distance between the first spatial coordinates and the second spatial coordinates is greater than or equal to a preset threshold, the orientation of the first side based on the second spatial coordinates.

12. The apparatus according to claim 9, wherein the audio information further comprises a second voice instruction of a second user, and the one or more processors are further configured to execute the instructions to cause the apparatus to:

control the display device to display the first image and a second image; and adjust the display device so that the first side faces the first user and a second side of the second image faces the second user, wherein the second side comprises second information to be communicated to the second user.

13. The apparatus according to claim 9, wherein the one or more processors are further configured to execute the instructions to cause the apparatus to adjust, based on the first spatial coordinates, a second location of the first image.

14. The apparatus according to claim 9, wherein the first spatial coordinates indicate a three-dimensional (3D) location of the first facial feature point in a vehicle comprising the display device.

15. The apparatus according to claim 9, wherein the one or more processors are further configured to execute the instructions to cause the apparatus to:

obtain, prior to adjusting the orientation of the first side, initial posture information indicating a posture angle and a second location of the display device;

determine a rotation angle and a rotation direction of the display device based on the first spatial coordinates and the initial posture information; and adjust, based on the rotation angle and the rotation direction, the orientation of the first side.

16. The apparatus according to claim 15, wherein the display device comprises a holographic projection device, and wherein the first image comprises a three-dimensional (3D) image.

17. A computer program product comprising computer-executable instructions stored on a non-transitory computer-readable storage medium, wherein the computer-executable instructions when executed by one or more processors of an apparatus cause the apparatus to:

display a first image;

obtain a first facial image of a first user;

adjust, based on first spatial coordinates of a first facial feature point of the first user, an orientation of a first side of the first image, wherein the first spatial coordinates are based on the first facial image, and wherein the first side comprises first information to be communicated to the first user;

obtain a second facial image of a second user; and adjust, based on second spatial coordinates of a second facial feature point of the second user, the orientation of the first side, wherein the second spatial coordinates are based on the second facial image.

18. The computer program product according to claim 17, wherein the computer-executable instructions when executed by the one or more processors further cause the apparatus to:

obtain, prior to obtaining the first facial image, audio information comprising a voice instruction of the first user that indicates to start or adjust a display device;

determine a sound source location of the audio information;

determine a location of the first user based on the sound source location; and further obtain the first facial image based on the location.

19. The computer program product according to claim 17, wherein the computer-executable instructions when executed by the one or more processors further cause the apparatus to:

obtain a third facial image of the first user;

determine third spatial coordinates of the first facial feature point based on the third facial image; and adjust, when a distance between the first spatial coordinates and the third spatial coordinates is greater than or equal to a preset threshold, the orientation of the first side based on the third spatial coordinates.

20. The computer program product according to claim 17, wherein the first spatial coordinates indicate a three-dimensional (3D) location of the first facial feature point in a vehicle comprising a display device, wherein the display device comprises a holographic projection device, and wherein the first image comprises a 3D image.

* * * * *